United States Patent
Ash et al.

(10) Patent No.: US 9,665,492 B2
(45) Date of Patent: *May 30, 2017

(54) FUZZY COUNTERS FOR NVS TO REDUCE LOCK CONTENTION

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,772

(22) Filed: Jul. 30, 2015

(65) Prior Publication Data

US 2015/0339182 A1 Nov. 26, 2015

Related U.S. Application Data

(63) Continuation of application No. 13/629,808, filed on Sep. 28, 2012, now Pat. No. 9,122,576.

(51) Int. Cl.
| | |
|---|---|
| *G06F 11/07* | (2006.01) |
| *G06F 12/0868* | (2016.01) |
| *G06F 3/06* | (2006.01) |
| *G06F 12/02* | (2006.01) |
| *G06F 12/0804* | (2016.01) |
| *G06F 12/0873* | (2016.01) |

(52) U.S. Cl.
CPC ........ *G06F 12/0868* (2013.01); *G06F 3/0619* (2013.01); *G06F 3/0644* (2013.01); *G06F 3/0653* (2013.01); *G06F 3/0679* (2013.01); *G06F 11/073* (2013.01); *G06F 11/0793* (2013.01); *G06F 12/0238* (2013.01); *G06F 12/0804* (2013.01); *G06F 12/0873* (2013.01); *G06F 2212/222* (2013.01)

(58) Field of Classification Search
CPC .................................................. G06F 12/0804
See application file for complete search history.

(56) References Cited

U.S. PATENT DOCUMENTS

| | | |
|---|---|---|
| 6,421,767 B1 | 7/2002 | Milillo et al. |
| 7,065,763 B1 | 6/2006 | Martin et al. |

(Continued)

FOREIGN PATENT DOCUMENTS

| | | |
|---|---|---|
| JP | 2003323340 A | 11/2003 |
| WO | 2011092045 A1 | 8/2011 |

*Primary Examiner* — David X Yi
*Assistant Examiner* — Zubair Ahmed
(74) *Attorney, Agent, or Firm* — Griffiths & Seaton PLLC

(57) ABSTRACT

A system for data management in a computing storage environment includes a processor device, operable in the computing storage environment, that divides a plurality of counters tracking write and discard storage operations through Non Volatile Storage (NVS) space into first, accurate, and second, fuzzy, groups where the first, accurate, group is one of updated on a per operation basis, while the second, fuzzy, group is one of updated on a more infrequent basis as compared to the first, accurate, group.

12 Claims, 5 Drawing Sheets

(56) References Cited

U.S. PATENT DOCUMENTS

| | | | |
|---|---|---|---|
| 2002/0035666 A1* | 3/2002 | Beardsley | G06F 11/1076 711/114 |
| 2002/0091694 A1 | 7/2002 | Hrle et al. | |
| 2003/0037204 A1 | 2/2003 | Ash et al. | |
| 2006/0173885 A1 | 8/2006 | Moir et al. | |
| 2008/0126708 A1 | 5/2008 | Gill et al. | |
| 2009/0300408 A1 | 12/2009 | Ash et al. | |
| 2011/0258391 A1* | 10/2011 | Atkisson | G06F 11/108 711/118 |
| 2012/0124294 A1* | 5/2012 | Atkisson | G06F 11/108 711/135 |

* cited by examiner

FUZZY COUNTERS FOR NVS TO REDUCE LOCK CONTENTION

CROSS REFERENCE TO RELATED APPLICATIONS

This application is a Continuation of U.S. patent application Ser. No. 13/629,808, filed on Sep. 28, 2012.

BACKGROUND OF THE INVENTION

The present invention relates in general computing systems, and more particularly to, systems and methods for increased data management efficiency in computing storage environments.

DESCRIPTION OF THE RELATED ART

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

Various embodiments for data management in a computing storage environment are provided. In one embodiment, by way of example only, a method for data management by a processor device in a computing storage environment, is provided. A plurality of counters tracking write and discard storage operations through Non Volatile Storage (NVS) space is divided into first, accurate, and second, fuzzy, groups where the first, accurate, group is one of updated on a per operation basis, while the second, fuzzy, group is one of updated on a more infrequent basis as compared to the first, accurate group.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing storage environments featuring Cached control units may threshold, or set limits, on an amount of Non Volatile Storage (NVS) space that ranks of storage are allowed to consume at any particular time. This prevents a single rank failure, for example, from consuming all of NVS space, and allows for multiple rank failures before all of NVS is consumed by failed ranks In one storage environment, a collection of counters, such as those that monitor (1) rank; (2) rank group (e.g., Enterprise, Spinning Disk, Solid State Devices); (3) point-in-time copy source (e.g., Flash Copy Source); (4) overall overwrite segment count; (5) overall segments; and (6) overall tracks; are controlled under a single lock, and are updated for every write to NVS and every discard from NVS, and are kept completely accurate.

Additionally, in one storage environment, so-called "Segment Levels" are defined, which may include (1) Quiesce (nearly empty); (2) Trigger (getting full), and (3) Priority (full) to provide long term tracing as various levels are crossed to aid in debugging performance and load balancing issues.

At the start of each write to NVS, the lock is obtained, and the various counters are checked to see if a new write can be allowed into NVS. If so, the segments are allocated for the write operation, the various counters are incremented, and long term tracing is performed if various levels are crossed.

For each discard operation from NVS, the lock is obtained, the various counters are decremented, and long term tracing is performed if various levels are crossed.

Due to the single lock, the above counter updates and tracing becomes an important section of code for performance in, for example, a multi-processor control unit. As the number of processors increase, reducing this important section of code, without losing the capability to perform the above thresholding, becomes a requirement to increase performance. A need exists for a data management mechanism that acts to reduce this important section without loss of the previously mentioned capability.

Some of the previously mentioned counters may not need to be accurate at all times for proper NVS thresholding. As a result, if all of the counters are not updated every instance a write or discard operation occurs from NVS, then the important section for the lock can be reduced, resulting in greater performance.

The mechanisms of the illustrated embodiments serve to categorize counters that are deemed necessary to be updated per each instance of a write or discard operation into one category, which is herein termed "accurate" counters, and an alternative, herein termed "fuzzy" counter category, where it is not as important to maintain an accurate count per each instance of the write and discard operation. By allowing those of the aforementioned counters not deemed to be necessary, the important section for the lock is reduced and performance is enhanced.

Figure 1:
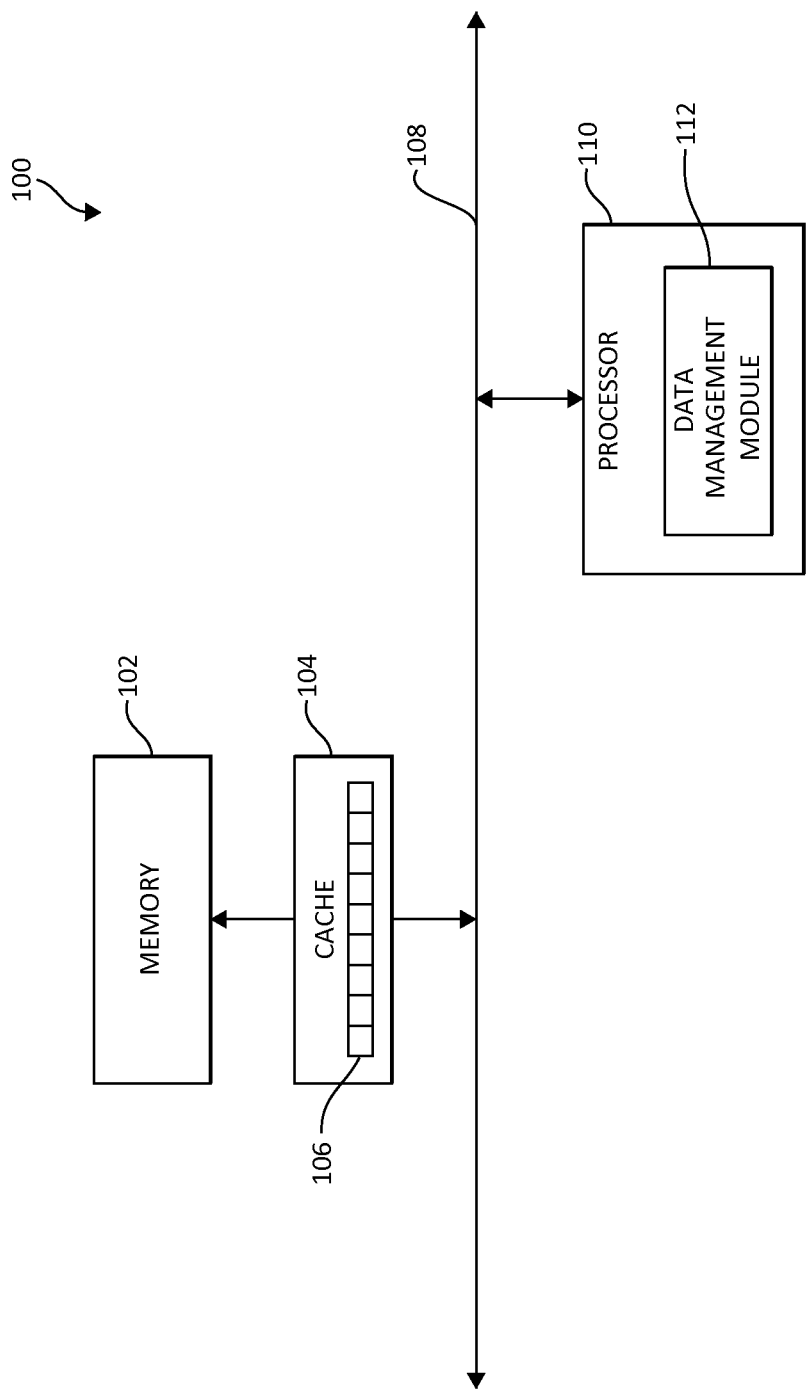
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a data management module 112, which comprises computer-readable code that, when executed by processor 110, causes processor 110 to perform data management operations in accordance with aspects of the illustrated embodiments. In the various embodiments, processor 110 divides a plurality of counters tracking write and discard storage operations through Non Volatile Storage (NVS) space into first, accurate, and second, fuzzy, groups where the first, accurate, group is one of incremented and decremented per each write and discard storage operation, while the second, fuzzy, group is one of incremented and decremented on a more infrequent basis as compared to the first, accurate group.

In various other embodiments, processor 110 determines which of the plurality of counters are to be categorized in which of the first and second groups of counters.

In various other embodiments, processor 110 removes the second group from a critical section under a storage lock, thereby reducing the critical section and improving performance.

In various other embodiments, processor 110 performs at least one of the write and discard storage operation.

In various other embodiments, processor 110, pursuant to performing the write operation, if the write operation is allowed, and pursuant to the discard storage operation, updates the accurate group of counters.

In various other embodiments, processor 110, if a count of added or removed segments reaches a predetermined threshold, updates the fuzzy group of counters.

In various other embodiments, processor 110 enforces at least one of an NVS thresholding maximum value during at least a portion of the performance of the write and discard storage operation.

Figure 2:
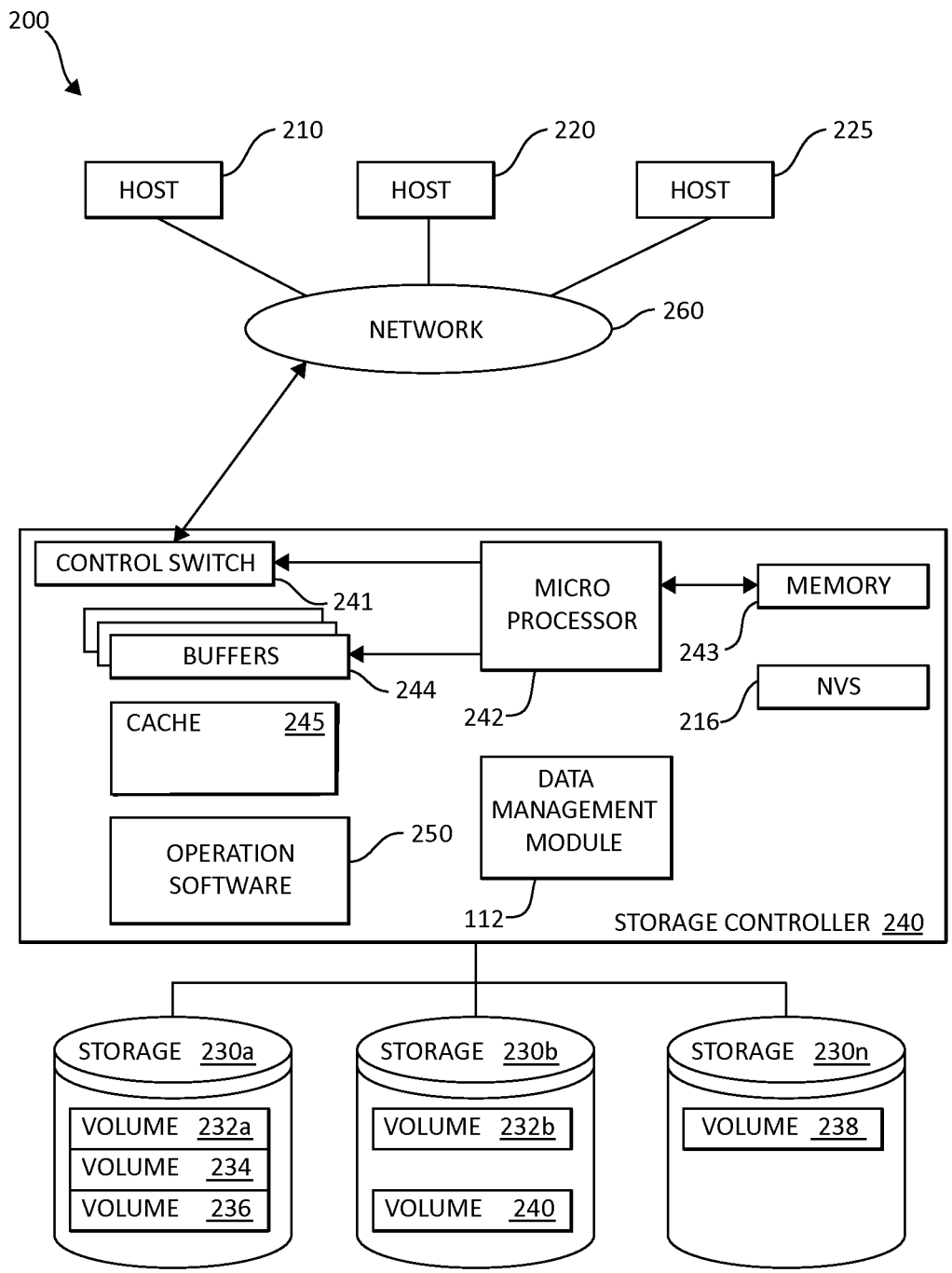
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a data management module 112. The data management module 112 may incorporate internal memory (not shown) in which the destaging algorithm may store unprocessed, processed, or "semi-processed" data. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240. Data management module 112, along with microprocessor 242 may implement aspects of the illustrated embodiments, such as establishing threshold factors as will be further described.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

Figure 3:
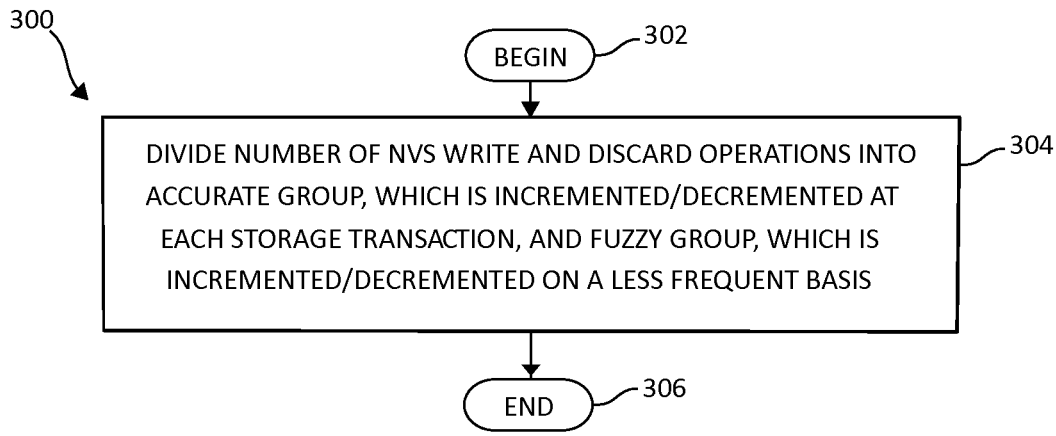
FIG. 3 is a flow chart diagram illustrating an exemplary method for increased efficiency in data management in a computing storage environment, again in which aspects of the present invention may be realized.

Turning now to FIG. 3, a flow chart diagram, illustrating a generalized method method 300 for data management, is depicted. Method 300 begins (step 302). A number of NVS write and discard operations is categorized into an "accurate" group, which is incremented/decremented at each storage transaction, and a "fuzzy" group, which is incremented/decremented on a less frequent basis (step 304). The method 300 then ends (step 306).

Figure 4:
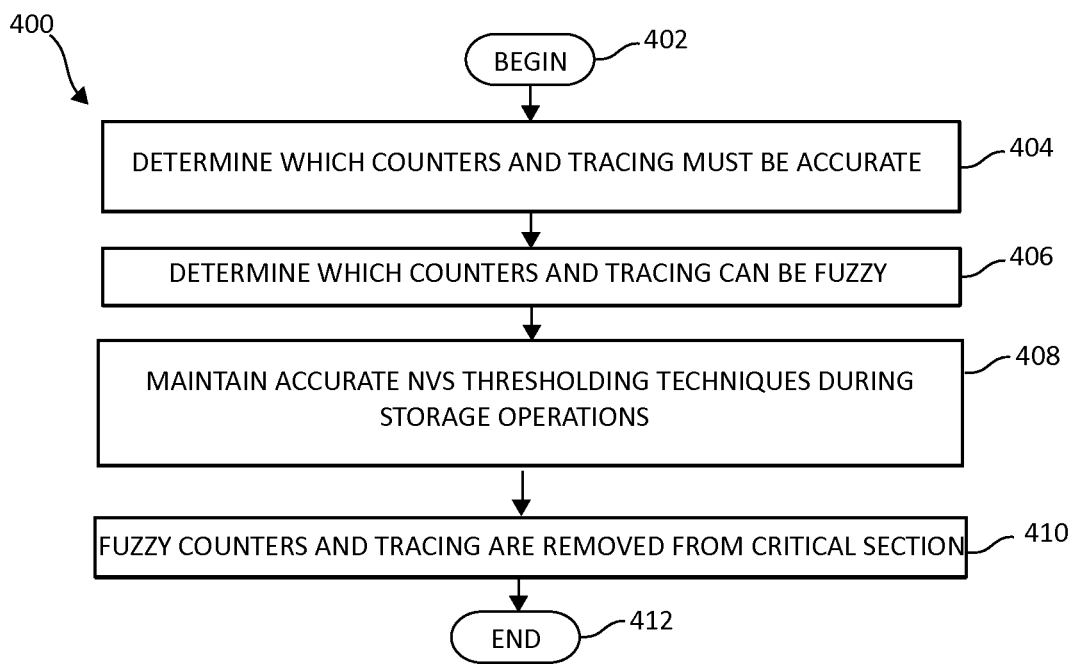
FIG. 4 is an additional flow chart diagram illustrating an exemplary method for performing various operations for data management enhancement, again in which aspects of the present invention may be implemented.

Turning now to FIG. 4, an additional flow chart diagram of exemplary operations in which aspects of the illustrated embodiments are incorporated, is depicted. Method 400 begins (step 402) with a determination of which counters and tracing must be categorized as "accurate" (step 404).

In a subsequent step, the method 400 determines which counters and tracing can be "fuzzy" (i.e., almost accurate within certain guidelines, but yet enable the maintenance of accurate NVS thresholding) (step 406). Various storage operations are then performed while accurate NVS thresholding techniques are performed (step 408). In accordance with steps 404, 406, and 408, method 400 then removes the fuzzy counters and tracing from the critical section to improve performance (step 410). The method 400 then ends (step 412).

In one embodiment, various mechanisms for accurate NVS thresholding may be implemented in conjunction with the maintenance of accurate and fuzzy counters. The mechanisms may take into account several NVS thresholding factors. The threshold factoring may be configured as follows. Individual ranks may be configured with a new threshold in addition to the percentage basis of overall space (i.e., 25% of NVS). A "Rank NVS Limit" threshold may be defined as the minimum function of the percentage threshold (again, i.e., 25% of NVS), and a defined "Rank NVS Limit for NVS Failback" benchmark for individual ranks.

In an additional embodiment, the Rank NVS Limit for NVS Failback may be defined as a rank destage input/output per second (IOPS) metric, multiplied by a drain time, and multiplied by a minimum NVS allocation.

The Rank destage IOPS metric may, in one embodiment, be defined as a number of destage IOPS a particular rank can do. This metric is dependent on the rank type and the drive types that make up a rank. In one example, a RAID-5 Nearline rank may complete five hundred (500) IOPS. The aforementioned drain time may, in one embodiment, be represented as the time that a failback operation takes to drain NVS during a Quiesce/Resume operation. In one exemplary embodiment, the drain time is set to about ten (10) minutes or 600 s. Finally, the aforementioned minimum NVS allocation may be represented as the minimum unit of NVS allocation. In one storage environment, the minimum NVS allocation is 4K (Kilobytes).

With all of the foregoing in view, consider the following example. A particular storage environment may have an accompanying rank NVS limit for failback, with RAID-5 Nearline ranks, as (500 IOPS*600 s*4096) as approximately equal to 1.2 GB.

An additional factor that may be used to determine the aforementioned rank NVS limit for failback is an amount of point-in-time copy source tracks in NVS. When a point-in-time copy source track is destaged, the track may require a Copy Source To Target (CST) operation before the source track can be destaged. A CST operation may consume a large amount of resources since the operation needs to stage data from the source, and then destage the data to the target.

To accommodate source point-in-time copy tracks, the aforementioned rank NVS limit for failback may be further defined as follows. The metric may be set equal to the aforementioned rank destage IOPS*drain time*minimum NVS allocation*the total tracks in NVS, divided by the total source point-in-time copy tracks in NVS*3+a total non-source point-in-copy racks in NVS. As one of ordinary skill in the art will appreciate, however, additional factors may be added or the aforementioned factors may be weighted to suit a particular application.

Figure 5:
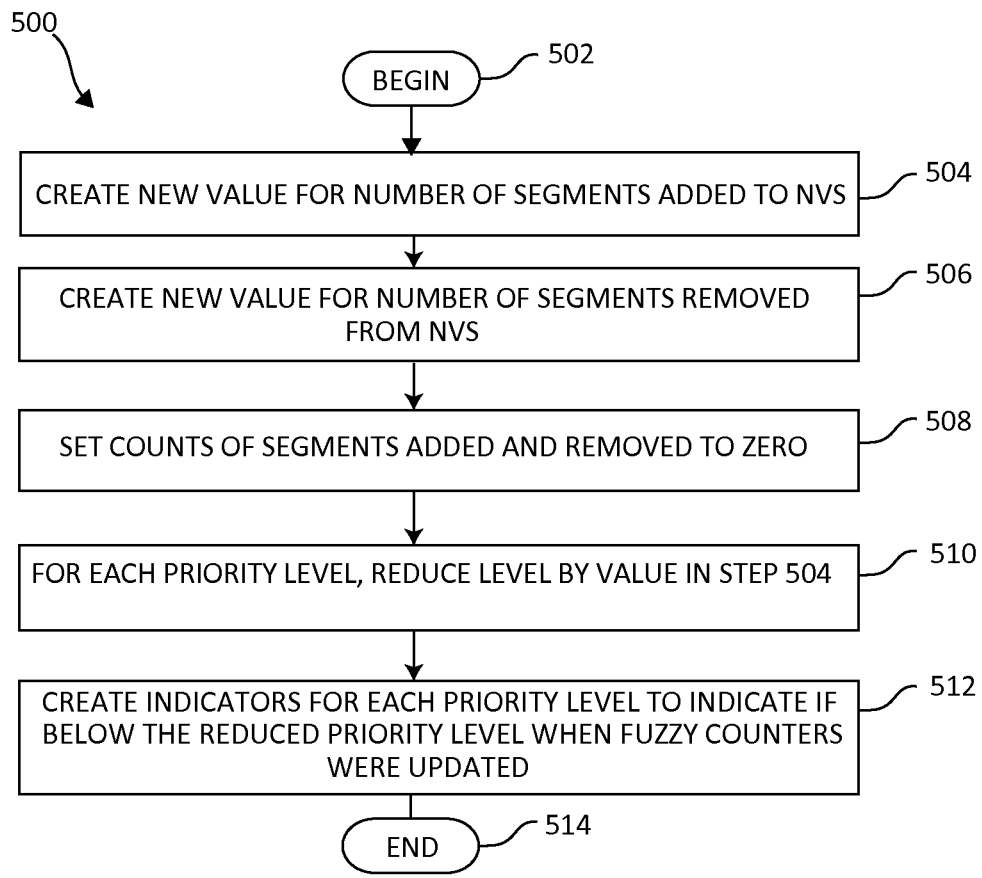
FIG. 5 is an additional flow chart diagram illustrating an additional exemplary method for performing various operations for data management enhancement, again in which aspects of the present invention may be implemented.

Turning now to FIG. 5, a flow chart diagram of additional exemplary operations, which may be undertaken in accordance with mechanisms of the illustrated embodiments, is depicted as method 500. Method 500 begins (step 502) with the creation of a new value (variable) for the number of segments added to NVS (step 504) to maintain synchronization. In an example of this step, consider the following. In one storage environment, a value of 1,700 segments may be created (i.e., about 100 tracks) to get the fuzzy counters in appropriate synchronization.

Method 500 continues with the creation of a new value (variable) for the number of segments removed from NVS to maintain synchronization (step 506). Here again, in the context of the instant example, a value of 1,700 segments may be created (again, about 100 tracks) to get the fuzzy counters in appropriate synchronization.

In step 508, counts of segments added and removed are set to zero. For each priority level (i.e., the maximum number of segments allowed), the priority level is reduced by the value created in step 504, previously (step 510). In the context of the instant example, if a certain rank priority level is 10,000 segments, then the reduced priority level is now 8,300 (10,000-1,700). Finally, indicators (Booleans) are created for each priority level to indicate if the particular level is below the reduced priority level when the fuzzy counters were updated (step 512). These indicators are checked for each write operation. The method 500 then ends (step 514).

Figure 6:
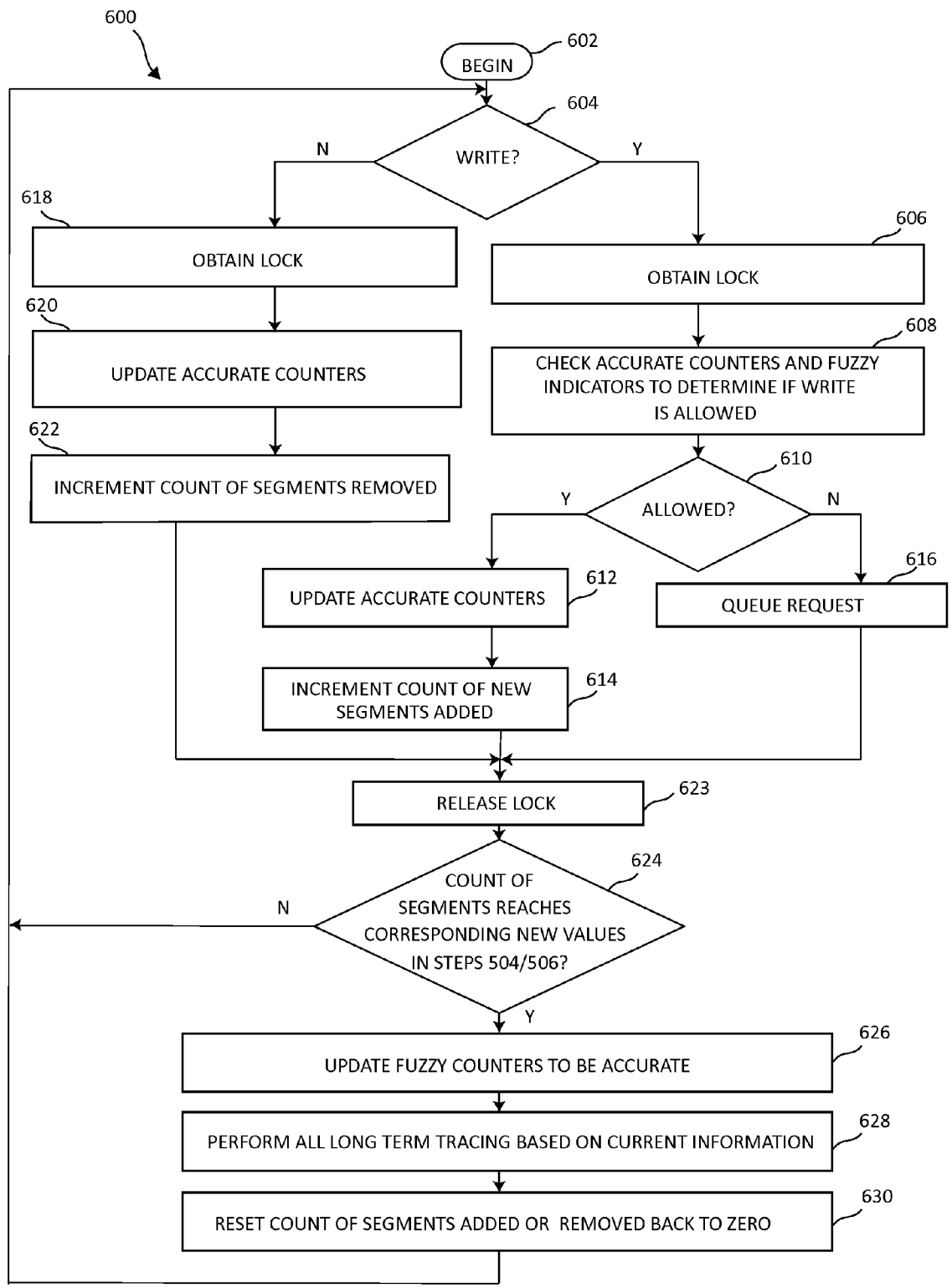
FIG. 6 is an additional flow chart diagram illustrating an additional exemplary method for performing various operations for data management enhancement, again in which aspects of the present invention may be implemented.

Turning now to FIG. 6, an additional flow chart illustrating an exemplary flow of various storage operations for the fuzzy and accurate counters previously described, is depicted as method 600. Method 600 begins (step 602) by querying whether the storage operation is a write operation (step 604). If so, the lock is obtained (step 606), and the accurate counters and fuzzy indicators are then checked to see if a write is allowed (step 608).

If the write is not allowed (step 610), the request is queued (step 616). The method 600 then releases the lock (step 623) and proceeds to step 624. Returning to step 610, if the write is allowed, the accurate counters are updated (step 612), and the count of new segments added mentioned previously is incremented (step 614). The method 600 then again releases the lock (again, step 623), and proceeds to step 624.

Returning to step 604, if the storage operation is not a write, but a discard operation, the lock is obtained (step 618), the accurate counters are updated (step 620), and the count of segments removed mentioned previously is incremented (step 622). The method 600 then again releases the lock (again, step 623) and proceeds to step 624.

In step 624, the method 600 queries whether the count of segments added or removed reached the corresponding new values obtained in steps 504 and 506 (FIG. 5, previously). If so, the fuzzy counters are updated to be accurate (step 626), all long term tracing is performed based on current information (step 628), and the count of segments added or removed is reset to zero (step 630). The method 600 then returns to step 604. Returning to step 624, if the count of segments added or removed has not reached the corresponding new values, the method 600 then returns to step 604 as previously.

Additional modifications may be made to FIGS. 5 and 6. In an additional embodiment, certain trigger events may be substituted or incorporated to the query of step 624 to cause the fuzzy counters to be made accurate. These events may include such storage operations as a statesave operation or a rank state change operation.

The mechanisms of the illustrated embodiments, in view of the exemplary functionality described in FIG. 5 and FIG. 6, previously, enable the fuzzy counters and long term tracing to not be inaccurate by more than the corresponding new values obtained in steps 504 and 506 (FIG. 5). In addition, the NVS thresholding factors or percentages are still accurately maintained. The critical section of code is reduced, which increases performance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A system for data management in a computing storage environment, comprising:
   a processor device, operable in the computing storage environment, wherein the processor device:
   divides a plurality of counters tracking write and discard storage operations through Non Volatile Storage (NVS) space into first, accurate, and second, fuzzy, groups; and
   removes the second group from a critical section under a storage lock, thereby reducing the critical section and improving performance;
   wherein the first, accurate, group is one of updated on a per operation basis, while the second, fuzzy, group is one of updated on a more infrequent basis as compared to the first, accurate group.

2. The system of claim 1, wherein the processor device determines which of the plurality of counters are to be categorized in which of the first and second groups of counters.

3. The system of claim 1, wherein the operation is one of a write operation and a discard operation, and the processor device performs at least one of the write and discard storage operation.

4. The system of claim 3, wherein the processor device, pursuant to performing the write operation, if the write operation is allowed, and pursuant to the discard storage operation, updates the accurate group of counters.

5. The system of claim 4, wherein the processor device, if a count of added or removed segments reaches a predetermined threshold, updates the fuzzy group of counters.

6. The system of claim 5, wherein the processor device enforces at least one of an NVS thresholding maximum value during at least a portion of the performance of the write and discard storage operation.

7. A computer program product for data management by a processor device in a computing storage environment, the computer program product comprising a computer-readable storage medium having computer-readable program code portions stored therein, the computer-readable program code portions comprising:
   a first executable portion that divides a plurality of counters tracking write and discard storage operations through Non Volatile Storage (NVS) space into first, accurate, and second, fuzzy, groups; and
   a second executable portion that removes the second group from a critical section under a storage lock, thereby reducing the critical section and improving performance;
   wherein the first, accurate, group is one of updated on a per operation basis, while the second, fuzzy, group is one of updated on a more infrequent basis as compared to the first, accurate group.

8. The computer program product of claim 7, further including a third executable portion that determines which of the plurality of counters are to be categorized in which of the first and second groups of counters.

9. The computer program product of claim 7, wherein the operation is one of a write operation and a discard operation, and further including a second executable portion that performs at least one of the write and discard storage operation.

10. The computer program product of claim 9, further including a third executable portion that, pursuant to performing the write operation, if the write operation is allowed, and pursuant to the discard storage operation, updates the accurate group of counters.

11. The computer program product of claim 10, further including a fourth executable portion that, if a count of added or removed segments reaches a predetermined threshold, updates the fuzzy group of counters.

12. The computer program product of claim 11, further including a fifth executable portion that enforces at least one of an NVS thresholding maximum value during at least a portion of the performance of the write and discard storage operation.

* * * * *